Nov. 4, 1969    G. ODONE    3,476,944
ELECTRONIC PHOTOMETER WITH PHOTOELECTRIC
ELEMENT CONTROLLED DIODE CIRCUITS
Filed Feb. 7, 1968
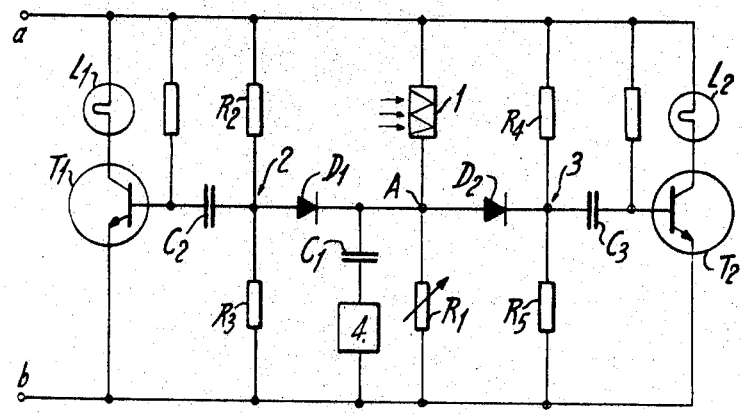
INVENTOR
GIOVANNI ODONE
BY
ATTORNEY 3,476,944
ELECTRONIC PHOTOMETER WITH PHOTOELECTRIC ELEMENT CONTROLLED DIODE CIRCUITS
Giovanni Odone, Lausanne, Vaud, Switzerland, assignor to Paillard S.A., Sainte-Croix, Vaud, Switzerland, a company of Switzerland
Filed Feb. 7, 1968, Ser. No. 703,657
Claims priority, application Switzerland, Mar. 16, 1967, 3,814/67
Int. Cl. H01j 39/12
U.S. Cl. 250—214          5 Claims

ABSTRACT OF THE DISCLOSURE

The photometer includes a photo-cell inserted in series with a resistance in a D.C. circuit, the value of said resistance being preferably equal to about the resistance of the photo-cell under normal conditions of illumination. A source of A.C. feeds the point connecting the photo-cell with the resistance and biased diodes of opposite polarities, so as to normally cause signals to pass through said diodes selectively for opposite alternations or else to be prevented from passing through said diodes. A modification in the illumination of the photo-cell disturbs the arrangement and allows the passage of current only through one diode. Said signals can be transmitted by transistors to lamps, or the like, illuminating or controlling means.

---

Electronic photometers are already known which include a photo-electric element subjected to a luminous flux, which depends at least on the illumination of the subject to be photographed by a photographic or kinematographic camera, while indicating means show whether the adjustment selected is lower or higher than the accurate value required and at least one member is adapted to modify the sensitivity of said means, so as to take into account at least one of the parameters governing the exposure of the film.

Generally speaking, the indicating means are constituted by a galvanometer which, as well known in the art, is a delicate and comparatively expensive instrument. It has also been proposed to replace the galvanometer by luminous indicating means. However, such indicating elements must operate under comparatively high voltages which leads to the necessity of resorting to comparatively intricate electric circuits.

The object of the present invention is to provide a highly sensitive electronic photometer circuit structure that can be readily constructed with a semiconductive element. More specifically, said invention relates to an electric photometer of the type including a photo-electric element to be subjected to a luminous flux which is a function of at least the illumination of the subject to be photographed by a photographic or kinematographic camera, indicating means showing whether the adjustment selected is accurate and at least one member adapted to adjust the sensitivity of said indicating means so as to take into account at least one of the parameters governing the exposure of the film.

According to the invention, the photoelectric element is inserted in a circuit biasing two diodes of opposite polarities, while a source of A.C. is connected with said circuit in a manner such that, according to the polarity supplied by the photo-element, the current produced by the source of A.C. passes through one diode or through the other.

The single figure of the accompanying drawing illustrates diagrammatically and by way of example a preferred embodiment of the photometer according to the invention.

Said photometer is fed by a supply of D.C. applied across the terminals $a$ and $b$. The photometer circuit includes, a photoelectric element of photo-cell 1, preferably of the photo-conductive type, connected in series with a resistance $R_1$ across the terminals $a$ and $b$. Two voltage dividers 2 and 3 are each formed by two resistances, $R_2$–$R_3$ and $R_4$–$R_5$ respectively, said resistances being connected pairwise in series across the terminals $a$ and $b$.

The middle points of the voltage dividers 2 and 3 are connected with a point A of the connection between the photo-cell 1 and the resistance $R_1$ by the Diodes $D_1$ and $D_2$ respectively.

A source 4 of A.C., which may be constituted for instance by an oscillator, is connected in series with the condenser $C_1$ across the terminals of the resistance $R_1$. The middle point of the voltage divider 2 is connected through a condenser $C_2$ with the base of a transistor $T_1$ also inserted in series with an incandescent lamp $L_1$ across the terminals $a$ and $b$. Similarly, the middle point of the voltage divider 3 is connected through a condenser $C_3$ with the base of a transistor $T_2$ inserted in series with a further incandescent lamp $L_2$ across the terminals $a$ and $b$.

The resistances $R_2$, $R_3$, $R_4$, $R_5$ of the voltage dividers are all of the same value, so that the middle points of said voltage dividers are subjected to a voltage equal to one half the voltage applied across the terminals $a$ and $b$. When the photo-conductive cell 1 shows a resistance equal to that selected for $R_1$, the connecting point A between said photo-cell and said resistance is subjected to the same voltage as the middle points of the two voltage dividers 2 and 3. Consequently, the A.C. voltage from the source 4 causes positive alternations of current to pass through the diode $D_2$ and negative alternations to pass through the diode $D_1$.

The positive current pulses thus produced constrain an A.C. voltage to appear across the terminals of the resistance $R_5$, which voltage is transmitted by the condenser $C_3$ to the base of the transistor $T_2$ which is thus rendered conductive by the positive alternations of current. Similarly, the passage of the negative alternations through the resistance $R_3$ produces signals transmitted by the condenser $C_2$ and rendering the transistor $T_1$ conductive. Thus, the two lamps $L_1$ and $L_2$ are permanently fed with current.

If the illumination applied to the photo-cell 1 varies, its resistance varies also and modifies the biasing of the diodes $D_1$ and $D_2$. For instance, if the resistance of the photo-cell 1 decreases, the voltage across the terminals of $R_1$ increases and the positive alternations fed by the source 4 pass through the diode $D_2$, while the negative alternations pass no longer through the diode $D_1$. The lamp $L_1$ is consequently extinguished while the lamp $L_2$ remains illuminated.

Obviously, if, in contradistinction, the resistance of the photo-cell 1 increases, the reverse phenomenon will be observed, and the lamp $L_1$ will be ignited, while the lamp $L_2$ will be extinguished.

The arrangement illustrated is highly advantageous since its sensitivity may be adjusted very easily by a mere modification of the amplitude of the signal supplied by the source 4. As a matter of fact, if $V_0$ designates the direct current voltage across the terminals $a$ and $b$ while $\Delta R$ designates the modification in the resistance of the photo-conductive cell 1 and if furthermore the resistance $R$ of said cell 1 is substantially equal to $R_1$, it is found that the modification in voltage at the connecting point A is given out by the equation:

$$V = \frac{1}{2} \frac{\Delta R}{R_1} V_0$$

A modification of $\Delta R/R_1$ by 0.1 may be obtained with the photo-conductive cells presently on the market for a modification in light corresponding substantially to a correction by one-tenth of a degree of the diaphragm opening. If it is assumed that $V_0$ is equal to 4 volts, the modification in voltage at the point A would be substantially equal to 0.2 volt. It is sufficient for the amplitude of the source of alternative current 4 to be of the same magnitude for the system to provide a highly satisfactory response. It should be remarked that a voltage of 0.2 volt is quite sufficient for the control of the transistors $T_1$ and $T_2$.

If the source 4 is selected so as to produce a signal of a high value, the simultaneous illumination of the two lamps $L_1$ and $L_2$ is retained throughout a larger range of modifications in illumination of the photo-conductive cell 1.

If, in contradistinction, the amplitude of the signal formed by the source 4 is reduced, it is possible to obtain an operation such that the lamps $L_1$ and $L_2$ are never energized simultaneously. The accurate exposure is then given out by the absence of ignition of said lamps and the inaccurate exposure by the ignition of one of said lamps or the other.

It should also be remarked that, in the arrangement described, the accuracy is not subjected to the influence of even important modifications in the voltage of the battery forming the source of direct current. As concerns the amplitude of the signal, it is quite uninfluenced by modifications in temperature.

Since the photometer described provides a high sensitivity, it is possible to resort to photocells of a comparatively low sensitivity.

Of course, the lamps $L_1$ and $L_2$ may be replaced by other indicating means. The current passing through the transistors $T_1$ and $T_2$ may, possibly after amplification, serve for the control of an electric motor coupled with the mechanism adjusting the luminosity of a kinematographic camera.

Obviously, it is not essential for the resistances $R_2$, $R_3$, $R_4$ and $R_5$ to be equal and it is an easy matter to provide embodiments of the invention wherein different values are selected for these resistances. In the case where it is desired to obtain a highly sensitive photometer, it is possible, for instance, to suitably select the values of the resistances $R_2$ to $R_5$, so as to take into account the value of the threshold voltage of conductivity for the diodes $D_1$ and $D_2$.

I claim:

1. A photometer for use with a kinematographic or photographic camera comprising a photoelectric element subjected to a luminous flux of an intensity depending on the illumination of a subject to be photographed, dual indicating means, a voltage-adjusting member, a connection between said member and the photoelectric element, a supply of alternating current, an electric circuit including said voltage-adjusting member and said photoelectric element, two diodes connected in said circuit in opposite polarity connection, said diodes connected to said alternating current supply and adapted to be alternately fed thereby, said diodes biased by a biasing voltage produced in said circuit in response to the illumination of said photoelectric element, and means connecting each diode with the corresponding indicating means to energize the latter in conformity with the light intensity impinging on the photoelectric element.

2. A photometer as set forth in claim 1, wherein the alternating current supply is connected to said diodes such that the alternations of the alternating current supply of one polarity are adapted to feed one of said diodes, and the alternations of the other polarity are adapted to feed the other of said diodes.

3. A photometer as set forth in claim 1, in which said electric circuit includes a supply of direct current feeding the photoelectric element and voltage-adjusting member in series, two voltage dividers inserted in parallel with said photoelectric element and voltage-adjusting member, means connecting the connection between the photoelectric element and voltage-adjusting member with corresponding points of both voltage dividers through said diodes.

4. A photometer as set forth in claim 1, in which said electric circuit includes a supply of direct current feeding the photoelectric element and voltage-adjusting member in series, said photoelectric element having a resistance substantially equal to that of the voltage-adjusting member for mean illumination of a subject to be photographed, two voltage dividers inserted in parallel with said photoelectric element and voltage-adjusting member, each of said voltage dividers including two equal resistances in series, and means connecting the connection between said photoelectric element and voltage-adjusting member with corresponding points of both voltage dividers lying between the two resistances thereof through said diodes.

5. A photometer as set forth in claim 1, in which said electric circuit includes a supply of direct current feeding the photoelectric element and voltage-adjusting member in series, two voltage dividers inserted in parallel with said photoelectric element and voltage-adjusting member, means connecting the connection between the photoelectric element and voltage-adjusting member with corresponding points of both voltage dividers through said diodes, and the means connecting each diode with the corresponding indicating means being constituted by a transistor, each said transistor connected in series with the corresponding indicating means and the series circuits of said transistors and indicating means connected in parallel with the voltage dividers, and the transistors having base elements connected for control by said diodes.

References Cited

UNITED STATES PATENTS

| 3,026,498 | 3/1962 | Galliers | 250—214 |
| 3,207,963 | 9/1965 | Steghart et al. | 323—75 |
| 3,281,817 | 10/1966 | Archer | 340—228 |

RALPH G. NILSON, Primary Examiner

M. ABRAMSON, Assistant Examiner

U.S. Cl. X.R.

250—206, 210; 324—65; 340—228